(12) United States Patent
Guiheen et al.

(10) Patent No.: US 6,892,525 B2
(45) Date of Patent: May 17, 2005

(54) MICROPUMP-BASED MICROTHRUSTER

(75) Inventors: James V. Guiheen, Madison, NJ (US); Thirumalai G. Palanisamy, Morristown, NJ (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 10/456,722

(22) Filed: Jun. 6, 2003

(65) Prior Publication Data
US 2004/0245406 A1 Dec. 9, 2004

(51) Int. Cl.[7] ................................................. F02K 9/42
(52) U.S. Cl. ...................... 60/200.1; 60/202; 60/203.1
(58) Field of Search ............................... 60/200.1, 201, 60/202, 266, 267, 203.1

(56) References Cited

U.S. PATENT DOCUMENTS

| | | | |
|---|---|---|---|
| 3,368,353 A | 2/1968 | Allport | |
| 3,553,964 A | 1/1971 | Kircher | |
| 3,591,967 A | * 7/1971 | Paine et al. | ............ 60/202 |
| 4,297,152 A | 10/1981 | Frankel et al. | |
| 5,836,750 A | 11/1998 | Cabuz | |
| 5,924,278 A | 7/1999 | Burton et al. | |
| 6,068,010 A | 5/2000 | Reinicke | |
| 6,106,245 A | 8/2000 | Cabuz | |
| 6,131,385 A | 10/2000 | Lewis et al. | |
| 6,141,497 A | 10/2000 | Reinicke et al. | |
| 6,263,665 B1 | 7/2001 | Ketsdever et al. | |
| 6,293,090 B1 | 9/2001 | Olson | |
| 6,295,804 B1 | 10/2001 | Burton et al. | |
| 6,378,292 B1 | 4/2002 | Youngner | |
| 6,403,403 B1 | 6/2002 | Mayer et al. | |
| 6,437,640 B1 | 8/2002 | Mayer et al. | |
| 6,539,703 B1 | * 4/2003 | Lohn et al. | ............ 60/203.1 |
| 2002/0139902 A1 | 10/2002 | Valentian | |

FOREIGN PATENT DOCUMENTS

WO    WO01/46581 A2    6/2001

OTHER PUBLICATIONS

"Micro–propulsion Colloid Thruster," internet source: www.busek.com/colloid.htm, printed Aug. 21, 2002, 2 pages.

Morring, Jr., Frank, "AvWeek: NASA New Millenium Project Will Help Test Einstein Theory," Apr. 29, 2002, internet source: www.aviationnow.com/avnow/news/channel_space.jsp?view=story&id=news/slisa0429—printed Jun. 5, 2002, 3 pages.

Bame, David P. et al, "Improved Micromachined Vaporizing–Liquid Microthruster," NASA Tech Brief, vol. 25, No. 11 from JPL New Technology Report NPO–21100, internet source: www.nasatech.com/Briefs/Nov1/NPO21100.html, 6 pages.

* cited by examiner

Primary Examiner—Ehud Gartenberg

(57) ABSTRACT

A thruster for providing thrust for spacecraft positioning, which has a propellant reservoir for storing propellant, a reaction chamber for discharging a vapor for providing thrust, a pump module comprising one or more micropumps for drawing propellant from the reservoir and for systematically metering propellant to the reaction chamber in a controlled manner, and a controller for actuating the pump module.

28 Claims, 2 Drawing Sheets

US 6,892,525 B2

MICROPUMP-BASED MICROTHRUSTER

FIELD OF THE INVENTION

The present invention generally relates to microthrusters, and more particularly relates to microthrusters utilizing micropumps.

BACKGROUND OF THE INVENTION

Spacecraft or satellite attitude control requires periodic use of thrusters to maintain or change spatial positioning. Because of severe restrictions in weight and size in spacecraft and satellites, it is important to provide very small thrusters capable of delivering small, precisely metered, controllable amounts of propellant in order to allow exact position control of satellites, especially small satellites. Many existing thrusters are cold gas thrusters, the gas propellants of which are stored under extremely high pressure in order to provide an adequate quantity of propellant, especially when the mission of the satellite is expected to be lengthy. The propellant is stored in relatively large and heavy tanks because of the high pressure. Additionally, the valves used to precisely meter the gases to the thruster nozzle are necessarily quite large and heavy as well, and usually comprise solenoid-operated on-off valves having carefully machined, and therefore expensive, components.

For smaller spacecraft and satellites, relatively low thrust may be required for, for example, three-axis positioning systems. Recently there has been an interest and significant activity in the design and use of microthrusters. Since the spacecraft or satellites that the microthrusters control are quite small, and space and weight are at a premium even with respect to larger craft and satellites, the thrusters must be exceptionally small and light as well, although capable of delivering thrust on the order of $1*10^{-6}$ lb. to 0.005 pounds or so. Larger spacecraft and satellites require larger thrusters.

Accordingly, it is desirable to provide a thruster that is both lightweight and small. In addition, it is desirable to provide a thruster having a valve and metering system that is small, lightweight, and relatively inexpensive to manufacture. Also it is desirable to provide a thruster having a valve that can be scaled to accommodate a number of different thrust requirements. Furthermore, other desirable features and characteristics of the present invention will become apparent from the subsequent detailed description of the invention and the appended claims, taken in conjunction with the accompanying drawings and this background of the invention.

BRIEF SUMMARY OF THE INVENTION

An apparatus is provided for use in satellites and other spacecraft. The apparatus includes a thruster for providing thrust for spacecraft positioning, which has a propellant reservoir for storing propellant, a reaction chamber for discharging a vapor for providing thrust, a pump module comprising one or more micropumps for drawing propellant from the reservoir and for systematically metering propellant to the reaction chamber in a controlled manner, and a controller for actuating the pump module.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the drawings.

Figure 1:
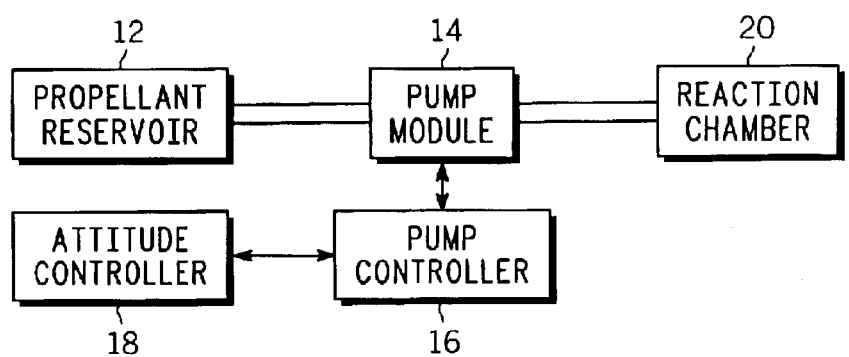
FIG. 1 is a schematic illustration of a microthruster according to the instant invention.

FIG. 1 is a schematic illustration of a microthruster according to the instant invention. As previously noted, microthrusters are relatively small thrusters used for positioning and maintaining the position of a spacecraft, such as a satellite, in space. As spacecraft become smaller, the thrusters must also become smaller because of space limitations. Also weight is always important in spacecraft design and construction because the cost to launch a spacecraft increases dramatically with weight. Older thrusters relied primarily on gas under pressure as a propellant. As the need for smaller and lighter thrusters became more important, different propellant technologies were considered, which do not require storage under pressure since the thrust from these propellants is developed by chemical or electromagnetic means. Included among these technologies are monopropellants such as hydrazine or HAN (HydroxylAmine Nitrate) used with TEAN (TriEthanolAmmonium Nitrate), which require a catalyst to change from a liquid to a gas, ionic liquids such as glycerol, NaI (sodium iodide), and liquid metals, heated liquids such as water over a hot surface, and hydrides such as Lithium borohydride and sodium borohydride.

The thruster 10 of FIG. 1 has a propellant reservoir 12 that is preferably, but not exclusively, a non-pressurized propellant reservoir. As noted above pressurized reservoirs or tanks tend to be large and heavy, so a non-pressurized solution is preferred. As will be explained below, however, a pressurized reservoir, at least of moderate pressurization, could also be used in the instant invention.

Thruster 10 also has a pump module 14 which will be described in greater detail below, and which communicates with the reservoir 12. While the term pump module is used herein to describe module 14, the module could also be considered a valve or metering module since, as will be seen, the pump module provides all of those functions. A pump controller 16 is coupled to the pump module 14 to actuate the pump on command from an attitude controller 18 to which the pump controller is coupled. The attitude controller 18 is a device which sends signals to the pump controller 16 to meter a precise amount of propellant from the reservoir.

Pump module 14 also communicates with a reaction chamber 20 in which chemical, electrothermal, electrostatic, or electromagnetic reactions are produced to provide propulsion for the thruster 10. Reaction chamber 20 may be one of several types of reaction chamber depending upon the type of propellant used for a particular thruster and the type of reaction necessary to provide a propellant plume which is directed from a nozzle to the exterior of the spacecraft to provide thrust. For example, if the propellant is a monopropellant, the reaction chamber will have some provision for directing the mixture at the catalyst (usually a solid, chemically-active surface) and turbulently mixing the propellant on the catalyst surface in order to produce the propellant plume that may be directed such as to provide thrust for the thruster. If the propellant is an ionic liquid, the reaction chamber may comprise an electrostatic screen in front of the nozzle to draw the propellant plume to and through the screen and if the reaction chamber is electrothermal, a heated element may be provided to transform a liquid propellant into a gaseous form or to transform a gaseous propellant into a gas of higher volume. Each of these and others will be described in greater detail below in conjunction with FIGS. 4, 5, and 6.

Figure 2:
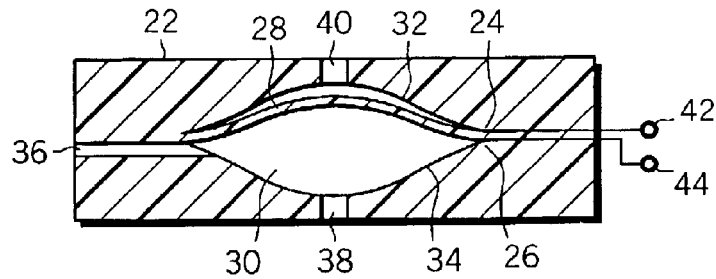
FIG. 2 is a schematic illustration of a micropump that is capable of use in the microthruster of the instant invention.

FIG. 2 is a schematic illustration of a micropump cell that is capable of use in the microthruster of the present invention. As may be seen in FIG. 2, the cell has a molded pump body 22 with an upper actuation electrode 24 and a lower actuation electrode 26. Body 22 also mounts an electrically grounded diaphragm 28 such that diaphragm 28 is capable of movement inside chamber 30 between upper electrode curved surface 32 and lower electrode curved surface 34. Body 22 also includes an inlet lateral conduit 36 and an outlet or inter-chamber conduit 38 in curved surface 34 which permits material in chamber 30 between diaphragm 28 and the lower electrode 26 to be discharged when voltage is applied to move diaphragm into substantial contact with surface 34. Body 22 also includes a back pressure control conduit 40 in the upper electrode curved surface 32.

Diaphragm 28 conforms to curved surfaces 32 and 34 when it is electrostatically driven to one or the other surfaces through application of a voltage to the particular electrode via voltage source 42 for upper electrode 24 and voltage source 44 for lower electrode 26. Diaphragm 28 and the curves surfaces 32 and 34 are coated with thin dielectric layers (not shown) for electrical insulation and protection.

Figure 3:
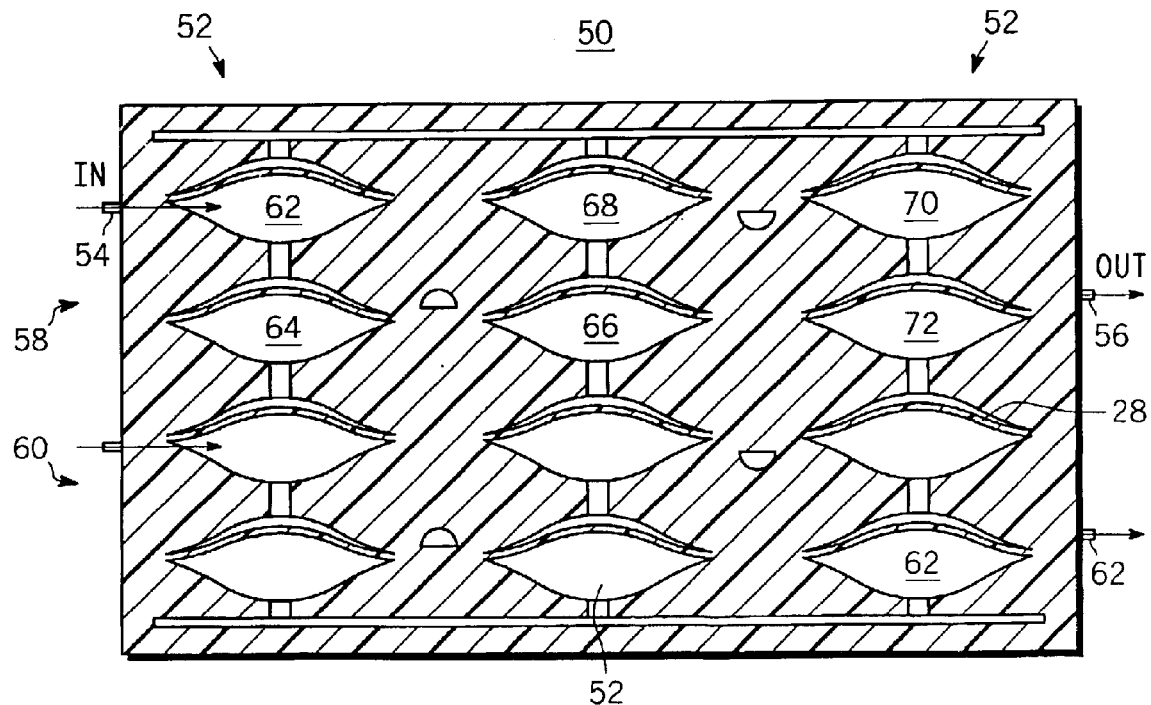
FIG. 3 is a schematic illustration of a plurality of the micropumps of FIG. 2 coupled together.

FIG. 3 illustrates a micropump that has been fabricated in a configuration which uses a plurality of cells of FIG. 2 in series. The micropump, 50 generally, consists of a plurality of cells 52 that efficiently and effectively transfer fluid from an inlet 54 to an outlet 56. This specific micropump 50 has an upper channel 58 and a lower channel 60, arranged in parallel relationship, with both channels functioning in the same manner, in accordance with the invention.

The body 62 is constructed by molding a high temperature plastic such as ULTEM (registered trademark of General Electric Company, Pittsfield, Mass.), CELAZOLE (registered trademark of Hoechst-Celanese Corporation, Summmit, N.J.), or KETRON (registered trademark of Polymer Corporation, Reading, Pa.). The electrodes themselves can be formed by printing, plating or EB deposition of metal followed by patterning by using dry film resist, as is known in the art. Low temperature organic and inorganic dielectric is used as an insulator between the actuating electrodes.

In operation of the cell of FIG. 2, the input conduit 36 is coupled to a reservoir (12 in FIG. 1) of the material to be pumped, and the diaphragm 28 is drawn to electrode 26 by application of an actuating voltage on terminal 44. When it is desired to pump material from the reservoir 12 the voltage on terminal 44 is released and an actuating voltage is applied to terminal 42. The diaphragm 28 is attracted to the upper electrode 24 and the vacuum thus created draws material from the reservoir 12 into chamber 30. The voltage on terminal 42 is then released and a voltage is applied to terminal 44 to draw diaphragm 28 toward electrode 26 and force the material in cavity 30 out through outlet conduit 38.

The operation of micropump 50 is similar, except that pump 50 has (in each of its two sections 58 and 60) six cells placed in a series configuration to increase the pumping pressure of the fluid to be pumped. The two sections 58 and 60 operate in parallel to increase the volume of fluid that may be pumped in a period of time. Material from a reservoir coupled to inlet 54 is drawn into the cavity of cell 62 by the process described above with respect to FIG. 2. The material is then pumped out of the cavity of cell 62 to an inlet of cell 64. Cell 64, in turn pumps its contents into cell 66, thence to cells 68, 70 and 72 from which the material is output through conduit 56. Of course on each cycle new material is drawn from the reservoir into cell 62, so the process is continuous.

A more detailed operation of the micropump 50 can be found in U.S. Pat. No. 6,106,245, Cabuz, which is assigned to the assignee of the present invention.

Micropump 50 is particularly suited for use in microthrusters used in spacecraft or satellites. As spacecraft become smaller, the thrusters must also become smaller because of space limitations. Also weight is always important in spacecraft design and construction because the cost to launch a spacecraft increases dramatically with weight. Older thrusters relied primarily on gas under pressure as a propellant. As the need for smaller and lighter thrusters became more important, different propellant technologies were considered, which do not require storage under pressure. The present invention provides such a microthruster.

Figure 4:
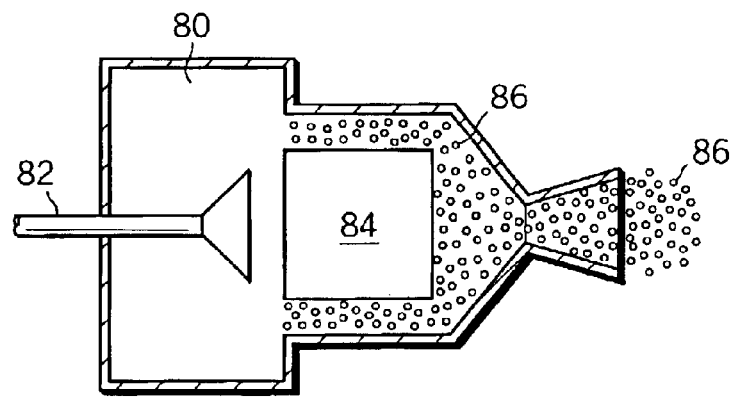
FIG. 4 is a schematic illustration of a reaction chamber usable in the instant invention.

FIG. 4 is schematic diagram of one type of reaction chamber 20 usable in the present invention. This reaction chamber is particularly suited for use in electrothermal or thermochemical propulsion systems. Electrothermal systems generally use cryogenically compressed gases or monopropellant liquid fuels (fuels which in their chemical structure contain both an oxidant decomposition species and a reductant decomposition species), or easily gasified liquids. Suitable cryogenically compressed gases include hydrogen, helium, xenon, and nitrogen. Some usable monopropellants are hydrazine, ammonia, N2O4, and monomethylhydrazine. Another suitable mono-propellant is an appropriate mixture of HAN and TEAN. Some easily gasified liquids include alcohols, ketones, alkanes, water, etc. If the propellant is a monopropellant or easily gasified liquid, the reaction chamber should have some provision for mixing the propellant. If the propellant is a monopropellant, the chamber could include a catalyst surface in order to assist ignition and produce the propellant plume that may be directed such as to provide thrust for the thruster. For oxidizable propellants, when an oxidant is provided (either as part of a monopropellant fuel, or as a separate reactant stream, the oxidizable propellant can be ignited by a suitable heat source or in the presence of a suitable catalyst surface.

Another suitable propellant for the chamber shown in FIG. 4 would be water reacted with a hydride. For example, if liquid water is pumped onto solid lithium borohydride (or a powder compact thereof), the result is solid lithium boroxide plus gaseous hydrogen. The gaseous hydrogen so produced is then used as a propellant plume. Sodium borohydride can also be reacted in this manner.

FIG. 4 shows the reaction chamber 20 having a mixing chamber 80 that receives a propellant through conduit 82 from the pump module (14 in FIG. 1). A catalyst surface(s) 84 or a heated surface(s) as described above is added to the mixing chamber. The said surface(s) may be roughened or geometrically arranged to create a suitable degree of mixing, heat transfer, turbulence, and surface contact between the propellant reactants and the chamber. As the volume of the propellant and any gaseous reaction products increase, that gas is expelled as a propellant plume 86 which provides thrust for the thruster. For HAN/TEAN mixtures, the catalytic surface may be composed of iron, copper, or other metals which are known to catalyze the ignition of the monopropellant.

For cases in which water is pumped onto a hydride, the reaction chamber (20) and the hydride bed are arranged in such a manner as to facilitate reaction of the hydride with water and the production and evolution of gaseous hydrogen.

Figure 5:
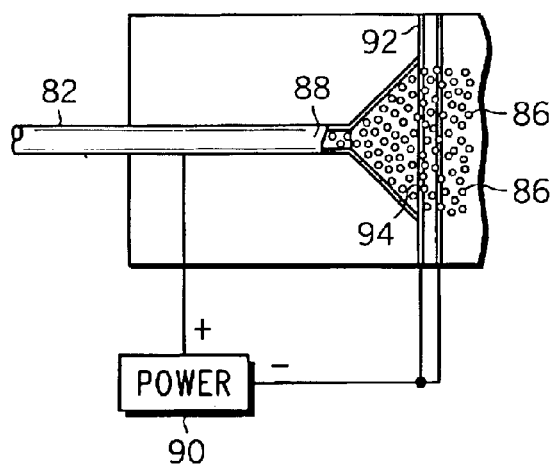
FIG. 5 is a schematic illustration of an alternative reaction chamber usable in the instant invention.

FIG. 5 is a schematic illustration of an alternative reaction chamber usable in the instant invention. In particular, FIG. 5 shows a reaction chamber suitable for use with an electrostatic or electromagnetic propellant. Electrostatic or electromagnetic propellants are ionizable liquefied gases, or ionic liquids that are drawn to a cathode by either an electrical voltage or a magnetic flux, or both. One suitable liquefied gas is xenon, Some suitable ionic liquids usable in the reaction chamber of FIG. 5 are doped glycerol, doped formamide, substituted imidazolium solutions (for example, solutions containing EMI 1-ethyl-3-methylimidizolium)), solutions containing [BF4]-ions, solutions containing sodium iodide, solutions containing mercury chloride, solutions containing aluminum chloride, solutions containing tributyl phosphate, solutions containing tetrabutylammonium tetraphenylborate, cesium, rubidium, indium, and gallium.

The reaction chamber 20 of FIG. 5 has a conduit 82 coupled to the pump module (14 in FIG. 1) through which the propellant is pumped into nozzle 88, which is fabricated from a conductive material. A source of electrical energy, shown here as power supply 90 but which may be any source of electrical energy, is connected with one terminal (usually the positive terminal) coupled to the nozzle 88 and the other terminal coupled to a conductive screen 92 (or multiple conductive screens) that is located at the exit port 94 of the reaction chamber 20. Alternatively, depending upon the propellant used, a flux generator may generate a magnetic field in front of the exit port 94 of the reaction chamber 20. In certain embodiments; and dependant upon the propellant used, both an electrical field and a magnetic field may be employed.

In operation, a propellant fluid is pumped into the reaction chamber 20 from the pump module (14 in FIG. 1). The nozzle breaks up the propellant liquid into droplets 86 of ionic material (or ionized gas) and the droplets (or ionized gas) are attracted to the cathode screen 92, or the magnetic field, or both. The droplets 86 are accelerated by the electrical or magnetic fields and exit through the exit port 94 of the reaction chamber 20 as a propellant plume to provide thrust for the thruster.

Figure 6:
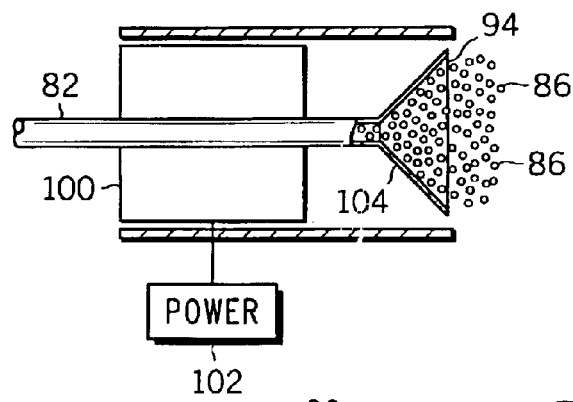
FIG. 6 is a schematic illustration of another alternative reaction chamber usable in the instant invention.

FIG. 6 is a schematic illustration of another alternative reaction chamber 20 usable in the instant invention, showing additional design configurations over FIG. 4. In particular, FIG. 6 shows a reaction chamber 20 suitable for use with easily gasified liquid propellants, such as water, alcohols, alkanes, ketones, gasoline, kerosene, etc.

FIG. 6 shows a reaction chamber 20 having a conduit 82 from the pump module (14 in FIG. 1) for receiving an easily gasified liquid. The liquid passes onto or through a heated element 100, which is heated to a temperature sufficient to turn the liquid into its gaseous phase. A power source 102, which may preferably be a source of electrical power, causes the element 100 to be heated and maintained at an appropriate temperature. In operation, a liquid is pumped through conduit 82 and passes onto or through a segment heated by heating element 100 where it is turned into a gas. Pressure forces the gas through a nozzle 104 positioned at the exit port 94 of reaction chamber 20, producing the propulsion plume 86 to provide thrust.

While an exemplary embodiment(s) has been presented in the foregoing detailed description of the invention, it should be appreciated that a vast number of variations exist. It should also be appreciated that these exemplary embodiments are only examples, and are not intended to limit the scope, applicability, or configuration of the invention in any way. Rather, the foregoing detailed description will provide those skilled in the art with a convenient road map for implementing a preferred embodiment of the invention. It being understood that carious changes may be made in the function and arrangement of elements described in an exemplary preferred embodiment without departing from the spirit and scope of the invention as set forth in the appended claims.

What is claimed is:

1. A thruster providing thrust for spacecraft positioning, comprising:
   a propellant reservoir for storing propellant,
   a reaction chamber for discharging a vapor for providing thrust,
   a pump module comprising one or more micropumps comprising cyclically-activated pumping diaphragms, drawing propellant from the reservoir and for systematically metering propellant to the reaction chamber in a controlled manner, and a controller for actuating the pump module; said thruster being a microthruster delivering a thrust between approximately 0.000001 to approximately 0.005 pounds force of thrust.

2. A thruster as set forth in claim 1 wherein the pump module comprises:
   at least one cavity having an upper surface and a lower surface,
   a conduit communicating a cavity and with the propellant reservoir,
   a conduit communicating a cavity and with the reaction chamber,
   a diaphragm located in each one of the at least one cavity the diaphragm being movable in a first mode to draw propellant from the propellant reservoir into a cavity and movable in a second mode to provide propellant from a cavity to the reaction chamber.

3. A thruster as set forth in claim 2 wherein the pump module comprises a plurality of cavities.

4. A thruster as set forth in claim 3 wherein the plurality of cavities are coupled in series such that a conduit of a cavity communicates with a conduit of another cavity.

5. A thruster as set forth in claim 3 wherein the plurality of cavities are coupled in parallel such that each cavity has a conduit communicating with the propellant reservoir.

6. A thruster providing thrust for spacecraft positioning, comprising:
   a propellant reservoir for storing propellant,
   a reaction chamber for acting upon the propellant to produce a propellant-plume for providing thrust, a pump module comprising one or more micropumps comprising cyclically-activated pumping diaphragms drawing propellant from the reservoir and for systematically metering propellant to the reaction chamber in a controlled manner, and a controller for actuating the pump module; said thruster being a microthruster delivering a thrust between approximately 0.000001 to approximately 0.005 pounds force of thrust.

7. A thruster as set forth in claim 6 wherein the pump module comprises:
at least one cavity having an upper surface and a lower surface,
a conduit communicating a cavity and with the propellant reservoir,
a conduit communicating a cavity and with the reaction chamber,
a diaphragm located in a diaphragm located in each one of the at least one cavity, the diaphragm being movable in a first mode to draw propellant from the propellant reservoir into a cavity and movable in a second mode to provide propellant from a cavity to the reaction chamber.

8. A thruster as set forth in claim 7 wherein the reaction chamber comprises a nozzle from which the propellant plume is exhausted for providing thrust.

9. A thruster as set forth in claim 6 wherein the propellant is a monopropellant and the reaction chamber further comprises a catalyst for reacting with the monopropellant for producing the propellant plume.

10. A thruster as set forth in claim 6 wherein the propellant is a monopropellant and the reaction chamber further comprises an igniter for igniting the monopropellant for producing the propellant plume.

11. A thruster as set forth in claim 9 wherein the propellant is a hydrazine.

12. A thruster as set forth in claim 9 wherein the propellant is HAN+TEAN.

13. A thruster as set forth in claim 9 wherein the propellant is monomethylhydrazine.

14. A thruster as set forth in claim 8 wherein the reaction chamber is electrostatic and further comprises an outer screen in front of the nozzle, the outer screen being electrically biased such that the propellant plume from the nozzle is attracted toward the outer screen to provide thrust.

15. A thruster as set forth in claim 14 wherein the propellant is an ionic liquid.

16. A thruster as set forth in claim 15 wherein the propellant is doped glycerol.

17. A thruster as set forth in claim 15 wherein the propellant is a sodium iodide solution.

18. A thruster as set forth in claim 8 wherein the reaction chamber is electromagnetic and further comprises a magnetic field in front of the nozzle, the outer screen being biased such that the propellant plume from the nozzle is attracted toward the field to provide thrust.

19. A thruster as set forth in claim 18 wherein the propellant is an inert gas.

20. A thruster as set forth in claim 19 wherein the propellant is Xenon.

21. A thruster as set forth in claim 18 wherein the propellant is nitrogen.

22. A thruster as set forth in claim 18 wherein the propellant is a hydrocarbon gas, such as methane.

23. A thruster in accordance with claim 8 wherein the propellant is a liquid and the reaction chamber comprises a hot surface such that the propellant is brought into contact with the hot surface to produce a propellant plume.

24. A thruster in accordance with claim 23 wherein the propellant is water.

25. A thruster providing thrust for spacecraft positioning, comprising:
a non-pressurized propellant reservoir for storing propellant,
a reaction chamber for acting upon the propellant to produce a propellant plume for providing thrust,
a pump module comprising one or more micropumps comprising cyclically-activated pumping diaphragms drawing propellant from the reservoir and for systematically metering propellant to the reaction chamber in a controlled manner, and a controller for actuating the pump module; said thruster being a microthruster delivering a thrust between approximately 0.000001 to approximately 0.005 pounds force of thrust.

26. A thruster as set forth in claim 25 wherein the pump module comprises:
at least one cavity having an upper surface and a lower surface,
a conduit communicating a cavity and with the propellant reservoir,
a conduit communicating a cavity and with the reaction chamber,
a diaphragm located in a diaphragm located in each one of the at least one cavity, the diaphragm being movable in a first mode to draw propellant from the propellant reservoir into a cavity and movable in a second mode to provide propellant from a cavity to the reaction chamber.

27. A thruster as set forth in claim 26 wherein a surface of the cavity is an electrode and the diaphragm is actuated by electrical current applied to the electrode.

28. A thruster as set forth in claim 27 wherein the diaphragm is deflected toward and away from the electrode when electric current is applied to or removed from the electrode.

* * * * *